April 29, 1941.  O. J. CROWE ET AL  2,240,288
MOLDING
Filed Jan. 27, 1938
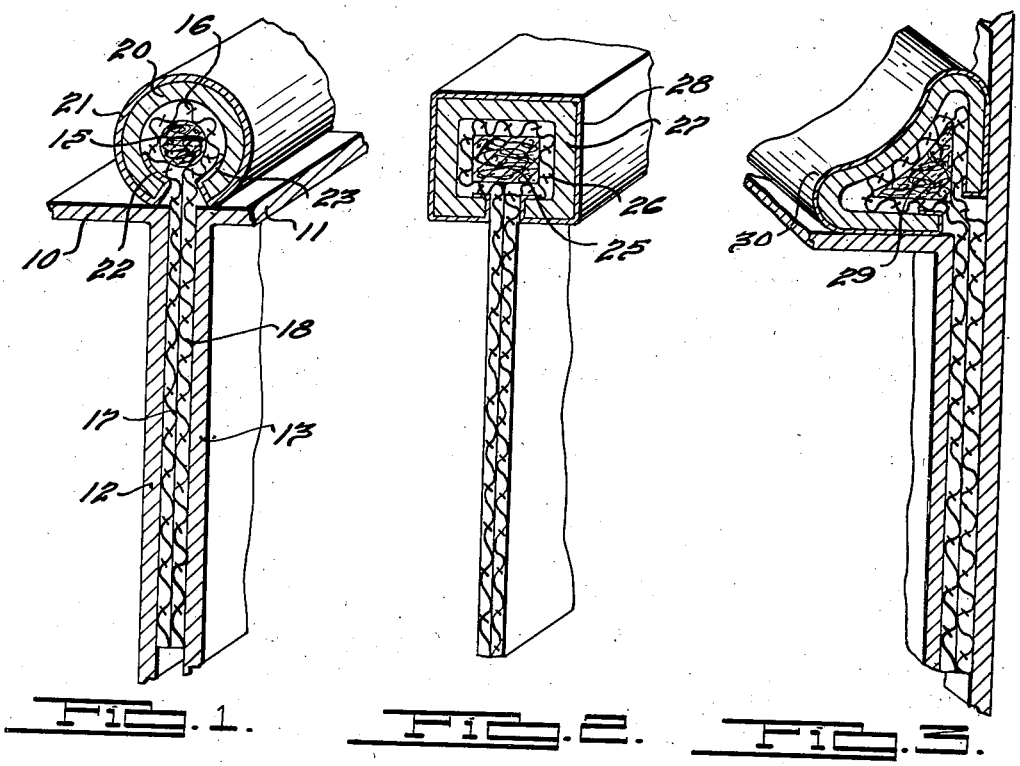
INVENTORS.
Orley J. Crowe,
BY William J. Hall.
Harness, Dickey & Pierce
ATTORNEYS Patented Apr. 29, 1941

2,240,288

UNITED STATES PATENT OFFICE 2,240,288

MOLDING

Orley J. Crowe and William J. Hall, Detroit, Mich.; said William J. Hall assignor of one-half to said Orley J. Crowe Application January 27, 1938, Serial No. 187,280

3 Claims. (Cl. 20—74)

The invention relates to bead molding, and it has particular relation to molding of this character for use between parts of motor vehicles.

One object of the present invention is to provide bead molding which can be manufactured very inexpensively and which provides a pleasing ornamental appearance.

Another object of the invention is to provide a bead molding including metal and flexible material, wherein the parts are held together in an improved manner.

Another object of the invention is to provide bead molding readily adaptable to different uses and applications such as between parts of motor vehicles or the like to prevent noise and also to conceal edges or edge openings.

Other objects of the invention will become apparent from the following specification, the drawing to which it relates, and from the claims hereinafter set forth.

For a better understanding of the invention, reference may be had to the drawing wherein:

Figure 1 is a cross-sectional view of bead molding constructed according to one form of the invention;

Figs. 2 and 3 are cross-sectional views similar to Fig. 1 showing similar types of bead molding of different shapes.

Referring to Figure 1, parts of a motor vehicle or the like are indicated at 10 and 11 and these parts have portions 12 and 13 that receive a part of the molding to be described. Generally the molding includes a substantially flat, web portion, to be fastened between the metal parts 12 and 13 and a bead along one edge of the substantially flat portion which closes and conceals the opening. The molding comprises a core or cord 15 that may consist of twisted fiber, rawhide, or similar material, and burlap or the like 16 which is wrapped around the core and which has leg portions 17 and 18 that project between the metal parts 12 and 13. Sheet metal 20 extends around the core 15 and that portion of the burlap extending around the core, and this metal terminates adjacent the web formed by the substantially flat portions 17 and 18.

The metal 20 may be of a relatively malleable steel of inexpensive character and for the purpose of providing a rust-proof and ornamental cover to the bead thus formed by the metal 20, the latter is covered by a relatively thin strip of stainless steel, or similar material 21, and this material extends around the edges of the metal 20 and part way around the burlap, as indicated at 22 and 23. It will be apparent that the cover 21 may be applied to the metal 20 while the latter is still in flat strip form and then the laminated assembly may be rolled around the burlap covered core until the laminated metal is of the shape shown. It may be noted that the parts 22 and 23 of the cover ordinarily will have a tendency to spring back towards the center of the core due to the fact that it would be difficult to roll such edge portions into a permanently flat relation with the metal 20, and this tendency to spring back towards the center of the core will assist in holding the burlap, core, and metal in tight assembly. If desired, the burlap may be cemented so as to hold the folded parts together and to hold such parts connected to the core. Additionally or alternatively, the folded parts, and particularly those parts forming the web, may be sewed together.

The foregoing construction provides a bead molding which is simple to manufacture, which has a flexible web or leg of burlap or the like adapting it to be used for anchoring the molding and for preventing squeaks between metal parts, and a metal bead which is inexpensive although ornamental owing particularly to the fact that a cheaper and heavier metal is in turn covered by a finishing or an ornamental cover. It might be added here that the burlap, if desired, may be impregnated with latex or other compositions to render it tacky and sound deadening.

The arrangement shown by Fig. 2 is similar to that shown by Fig. 1 with the exception that the core, indicated at 25, is of rectangular shape and the burlap, inner metal, and covering, indicated at 26, 27, and 28, respectively, correspond in shape to that of the core. It is apparent that this type of construction is adapted to be used similarly to that shown by Fig. 1.

In Fig. 3, the core is of triangular shape, as indicated at 29, and the other parts substantially correspond in shape thereto. It may be noted that the outer face of the core is slightly concave and that this concavity is carried to the finish or cover member, as indicated at 30. This type of construction is more particularly adapted for use at corners, or the like.

Although more than one form of the invention has been illustrated and described, it will be apparent to those skilled in the art that various modifications may be made without departing from the scope of the appended claims.

What is claimed is:

1. Bead molding comprising a hollow, metal bead, having a slot opening extending linearly thereof, a core extending longitudinally within the bead, a flexible member extending into the slot, and folded around the core, and a thin covering member folded around the metal bead and having its edges projecting into the slot and folded around the edges of the metal bead.

2. Bead molding comprising a hollow metal bead having a longitudinal slot in its wall, a flexible member providing a leg exteriorly of the bead and projecting into the bead through the slot, and a thin covering member folded around the metal bead and having its edges projecting into the slot and resiliently engaging the flexible member within the bead.

3. Bead molding comprising a hollow metal bead member having a longitudinal slot in its wall, a flexible member providing a web exteriorly of the bead and projecting thereinto through the slot and having a folded edge within the bead and a thin metal covering folded around the bead and having its edges projecting into the slot and folded around the edges of the hollow bead member, said folded edges having resilient engagement with the folded portion of the flexible member.

ORLEY J. CROWE.
WILLIAM J. HALL.